US010543958B1

(12) United States Patent
Henderson

(10) Patent No.: US 10,543,958 B1
(45) Date of Patent: Jan. 28, 2020

(54) SEALANT FOR TUBES OF CURABLE SUBSTANCES

(71) Applicant: Keokuk Caulk Wax LLC, Saint Louis, MO (US)

(72) Inventor: Michael J. Henderson, Saint Louis, MO (US)

(73) Assignee: KEOKUK CAULK WAX LLC, St. Louis, MO (US)

( * ) Notice: Subject to any disclaimer, the term of this patent is extended or adjusted under 35 U.S.C. 154(b) by 74 days.

(21) Appl. No.: 15/665,580

(22) Filed: Aug. 1, 2017

Related U.S. Application Data

(60) Provisional application No. 62/371,292, filed on Aug. 5, 2016.

(51) Int. Cl.
*B65D 25/48* (2006.01)
*B65D 47/06* (2006.01)

(52) U.S. Cl.
CPC ............ *B65D 25/48* (2013.01); *B65D 47/06* (2013.01)

(58) Field of Classification Search
None
See application file for complete search history.

(56) References Cited

U.S. PATENT DOCUMENTS

| 4,284,213 A | 8/1981 | Lee |
| 5,248,071 A | 9/1993 | Ray |
| 7,032,790 B2 | 4/2006 | Williamson, IV et al. |
| 2001/0048198 A1 | 12/2001 | Dulin |
| 2009/0014481 A1 | 1/2009 | Benetti |
| 2010/0051622 A1 | 3/2010 | Loso et al. |

*Primary Examiner* — Colin W. Slifka
(74) *Attorney, Agent, or Firm* — Thompson Coburn LLP

(57) ABSTRACT

A sealant releasably seals a distal end of a tip of a tube containing a curable substance dispensable from the tip of the tube. The sealant has between about 20 N and about 60 N of penetration resistance force in a penetration resistance test, wherein the penetration resistance test comprises: (i) placing the sealant in a container at room temperature such that the sealant has a top surface defining a plane; (ii) attaching a conical probe to a force gage wherein the conical probe has a tip length of 7.5 mm, a diameter of 9 mm, and an overall length of 20 mm; (iii) moving the conical probe perpendicularly relative to the plane of top surface of the sealant; and (iv) inserting the conical probe into the sealant to an insertion depth of between 8 mm and 12 mm to generate the penetration resistance force.

20 Claims, 2 Drawing Sheets

SEALANT FOR TUBES OF CURABLE SUBSTANCES

CROSS-REFERENCE TO RELATED APPLICATIONS

This patent application claims the benefit of provisional patent application Ser. No. 62/371,292, which was filed on Aug. 5, 2016.

BACKGROUND AND SUMMARY

The present disclosure is related to a seal for sealing a tip of a tube of a curable substance once the tube is opened.

DETAILED DESCRIPTION

Figure 1:
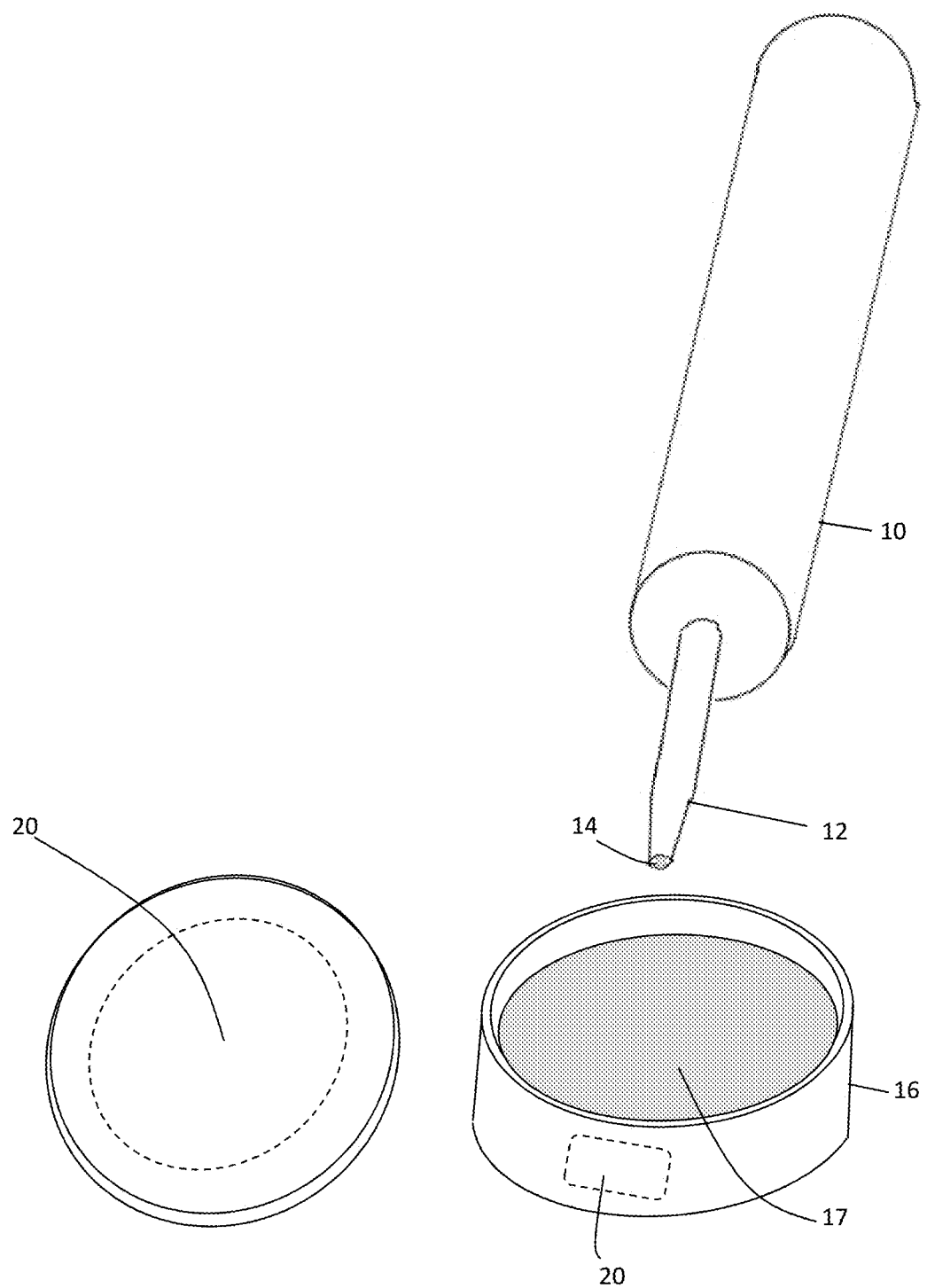
FIG. 1 is a perspective view of a caulk tube applicator tip with a seal formed therein after the applicator tip was inserted into a container of seal material.

FIG. 1 shows an exemplary tube 10 that may be used. In the drawings, a caulk tube is shown, but the disclosure herein may be used in connection with any tube having an applicator tip, for instance, glue, lubricant, adhesives. In FIG. 1, the tube has an applicator tip 12 from which caulk in the tube is ejected. After the applicator tip 12 is opened and the user wants to maintain the integrity of the caulk in the tube, the user may form a seal 14 in the applicator tip 12 of the caulk tube. The seal 14 maintains the viability and durability of the caulk in the tube and prevents the caulk from solidifying and curing in the applicator tip 12 or tube, which otherwise prevents the caulk in the tube from being subsequently ejected from the applicator tip 12.

The user may insert the seal 14 in the applicator tip 12 by inserting the applicator tip 12 into a container 16 of seal material 17. To facilitate formation of the seal 14, the container 16 of the seal material 17 may have a depth sufficient to allow the user to insert the applicator tip 12 into the container 16 and force seal material 17 through the opening in the applicator tip 12. The depth of the container 16 and the amount of seal material 17 forced into the applicator tip 12 may be set so as to form an airtight internal plug in the applicator tip. The container may be a rigid cylindrical structure as shown in the drawings or may be a flexible structure for instance a bag containing the sealant. For instance, the container may be a 2 fluid ounce container with a circumference of 70 mm and a depth of 33.9 mm. The seal material may fill the container to between ¾ inches to 1 inches. The tube may be inserted to full depth in the container to insert seal material in the tip through the distal end. As seal material enters the tip, the seal material displaces the caulk from the distal end of the tip back toward and into the tube so as to occupy the tip from the distal end of the tip inward at a length that corresponds to the level of seal material in the container (e.g., ¾ inches to 1 inches). When the user wishes to reuse the caulk tube, the user may place the caulk tube in a caulk gun and advance the caulk tube plunger to push the seal out of the tip and restart the advancement of caulk from the tube. The seal material preferably flows easily from the distal end of the tip of the tube and is expelled from the distal end of the tip prior to the curable substance being expelled from the distal end of the tube. Thus, the seal material is expelled ahead of any caulk being expelled from the distal end of the tip. Further, the material is expelled without over pressurizing the tube which might otherwise cause caulk to leak between the plunger of the tube and the side walls of the tube. The seal material in the container has sufficient resistance and cohesiveness to allow the tip to be inserted in a manner to force the seal material into the tip and displace the caulk occupying the tip. However, the seal material must be sufficiently pliable to allow it to be expelled from the distal end of the tip without it causing the user to over pressurize the tube or the caulk to be advanced over or ahead of the seal material from the tip. The seal material preferably abuts the interior surfaces around the distal end of the tip of the tube so as to prevent air leakage between the seal material and the interior surfaces of the tip. The seal material is preferably level or flush with the distal end of the tip of the tube for the same reasons. In that regards, the seal material preferably has no shrinkage away from the interior surfaces of the tip. Further, the seal material is preferably sealingly releasable from distal end of the tip of the tube in manner to prevent degradation of the caulk in the tube after storing the tube upright at room temperature for 7 days, and more preferably after 30 days.

For other tubes, the user may apply pressure to the tube as applicable based upon the design of the tube (i.e., squeeze the bottom of the tube) to eject the contents of the tube from tube and push the seal material out of the tip of the tube. The seal material 17 forms an air tight seal in the applicator tip without permanently adhering to internal surfaces of the applicator tip.

A seal material comprising about 60% by weight slack wax and about 40% by weight crème wax has been found satisfactory for use as a seal material. In Example 1, the seal material was formed by measuring out about 1.2 ounces of slack wax and 0.8 ounces of crème wax. The crème wax and slack wax components were melted and mixed until a homogeneous composition. The composition was then poured into a 2 ounce, 70 mm circumference, 33.9 mm deep, thick walled, puck style container. The composition was left to cool to room temperature to form the seal material. The seal material had a depth of about 1 inch in the container.

In this Example 1, the seal material showed the ability to repeatedly withstand about 37 N in a penetration force resistance test. In the penetration force resistance test, the seal material in the container was placed at room temperature. A NK-200 push/pull force gage having a pointed push attachment (~9 mm diameter×~7.5 mm height×20 mm overall length cone attachment) was aligned perpendicular to the top surface of the seal material in the container. The gage was moved vertically downward in a perpendicular direction until the conical attachment probe was gently inserted into the seal material to a depth of about 8 mm to about 12 mm. A penetration resistance force was generated during insertion of the probe to the insertion depth. As will be explained below, a penetration resistance force of about 20 N to about 60 N was found acceptable for the seal material. More preferably, a penetration resistance force of about 25 N to about 55 N was found acceptable for seal material. More preferably, a penetration resistance test force of about 30 N to about 50 N was found acceptable for seal material.

The penetration resistance force was found to correlate directly to the following characteristics of the seal material: (i) flowability into the applicator tip of a tube, (ii) displacement of the curable substance in the tip, (iii) formation of a seal in the tip with the seal material level or flush with the distal end of the tip and abutting the interior surfaces around the distal end of the tip of the tube so as to prevent air leakage between the seal material and the interior surfaces of the tip, (iv) ejectability from the tip of the tube with a manual caulk gun without causing excessive back pressure in the tube, and (v) consistency in physical properties after insertion in the application tip after prolonged exposure to normal room temperature condition for several days.

The seal material of example 1 was tested with three caulk, the tips of three caulk tubes (for instance, Dap™ Alex™ Fast Dry Caulk) were cut respectively at ⅛ inch, ¼ inch, and 5/16 inch diameters to form a distal end of the tip. The seal material was deposited in the tip by inserting the tip of each tube into the container of seal material to the full depth of seal material in the container (i.e., about ¾ inch to 1 inch). As tip was inserted into the composition of seal material in the container, the seal material displaced the curable material already present in the tip of tube, forcing the curable material toward the tube thereby allowing the seal material to occupy a volume in the tip of the tube to seal the distal end of the tip of the tube. The distal end of each tube was inspected. In each case, the seal material was level with the distal end of the tip and completely abutted interior surfaces around the distal end of the top. Each tube was placed in a manual caulk gun and caulk advanced to expel the deposit of seal material from the tip distal end. The seal material was expelled from the distal end of the tip prior to any curable substance being expelled from the distal end of the tip, or curable substance being expelled from around the plunger and walls of the tube. The expelled deposit of seal material had a length of about ¾ inches to 1 inch. Each deposit of seal material was expelled with ease and in no case was the curable substance (e.g., caulk) released from the tip distal end before the plug was expelled or from around the plunger and side walls of the tube. In this Example 1, the seal material was inserted in respective tube tip distal end and expelled from the respective tube through advancement in a manual caulk gun ten times in succession. After each deposit of seal material into the tip distal end for each respective tube, the seal material was level with the distal end of the tip and completely abutted interior surfaces around the distal end of the top. Additionally, after each deposit was expelled from the tip distal end for each tube, there was no change in the length or consistency of the expelled deposit of seal material. The seal material was then deposited in each respective tube tip distal end as described above. The tubes were stored upright at room temperature for 7 days. After 7 days, the distal end of each tube was inspected. In each case, the seal material was level with the distal end of the tip and completely abutted interior surfaces around the distal end of the top. Each tube was placed in a manual caulk gun and caulk advanced to expel the deposit of seal material from the tip distal end. The expelled deposit of seal material had a length of about ¾ inches to 1 inch. Each deposit of seal material was expelled with ease and in no case was the curable substance (e.g., caulk) released from the tip distal end before the plug was expelled. The seal material was then deposited in each respective tube tip distal end as described above. The tubes were stored upright at room temperature for 30 days. After 30 days, the distal end of each tube was inspected. In each case, the seal material was level with the distal end of the tip and completely abutted interior surfaces around the distal end of the top. Each tube was placed in a manual caulk gun and caulk advanced to expel the deposit of seal material from the tip distal end. The expelled deposit of seal material had a length of about ¾ inches to 1 inch. Each deposit of seal material was expelled with ease and in no case was caulk released from the tip distal end before the plug was expelled. Other compositions of seal material were tested and were found to not perform as well as the composition of seal material in Example 1.

In Example 2, a composition of seal material comprising 100% slack wax was unable to maintain consistency of length after being expelled from tip distal end of each respective tube during successive deposit and expelling through advancement in a manual caulk gun. Further, the composition was unable to consistently displace the curable substance in the tip of the tube after repeated insertion in the container. Further, often the curable substance in tube was advanced from the applicator tip without removing the seal material. In the penetration resistance test, the seal material of Example 2 has penetration resistance force of between 8 N and 13 N.

In Example 3, a composition of seal material comprising about 50% slack wax and about 50% paraffin wax was found after deposit in the tip distal end unable to stay level with the tip distal end and unable to completely abut interior surfaces around the tip distal end. Further, the composition was found to be too difficult to deposit in the tip distal end by insertion of the tip in the container, and the composition was too difficult to expel from the tip with ease and caused excessive backpressure in the tube. In the penetration resistance test, the seal material of Example 3 had a penetration resistance force of about 90 N.

In Example 4, a composition of seal material comprising about 50% slack wax, about 35% paraffin wax, and about 15% soy wax was found to be too difficult to deposit in the tip distal end by insertion of the tip in the container. Further, the composition was too difficult to expel from the tip with ease and caused excessive back pressure in the tube. In the penetration resistance test, the seal material of Example 4 had a penetration resistance force of 78 N.

In Example 5, a composition of seal material comprising about 50% slack wax, about 25% palm wax, and about 25% paraffin was found to be too difficult to deposit in the tip distal end by insertion of the tip in the container. Further, the composition was too difficult to expel from the tip with ease and caused excessive backpressure in the tube. In the penetration resistance test, the seal material of Example 5 had a penetration resistance force of 82 N.

In Example 6, a composition of seal material comprising about 50% slack wax, about 45% palm wax, and about 5% paraffin wax was found to be too difficult to deposit in the tip distal end by insertion of the tip in the container. Further, the composition was too difficult to expel from the tip with ease and caused excessive back pressure in the tube. Additionally, the composition tended to be gritty and to dry out in the tip such that the composition after deposit in the tip distal end was unable to stay level with the tip distal end and unable to completely abut interior surfaces around the tip distal end. In the penetration resistance test, the seal material of Example 6 had a penetration resistance force of 74.

In Example 7, a composition of seal material comprising about 50% slack wax, about 25% palm wax, and about 25% soy wax was found to be too difficult to deposit in the tip distal end by insertion of the tip in the container. Further, the composition was too difficult to expel from the tip with ease and caused excessive back pressure in the tube. In the penetration resistance test, the seal material of Example 7 had a penetration resistance force of 63 N.

In Example 8, a composition of seal material comprising about 50% slack wax, 25% palm wax, and 25% crème wax was found to be too difficult to deposit in the tip distal end by insertion of the tip in the container. Further, the composition was too difficult to expel from the tip with ease and caused excessive back pressure in the tube. In the penetration resistance test, the seal material of Example 8 had a penetration resistance force of 64 N.

In Example 9, a composition of seal material comprising about 50% slack wax, about 35% soy wax, and about 15% palm wax was found in the penetration resistance test to have a penetration resistance force of about 39 N.

In Example 10, a composition of seal material comprising about 50% slack wax, about 35% soy wax and about 15% crème wax was found in the penetration resistance test to have a penetration resistance force of about 55 N.

In Example 11, a composition of seal material comprising about 50% slack wax and about 50% crème wax found in the penetration resistance test to have a penetration resistance force of yield at about 49 N.

As shown in the drawings, the container 16 containing the seal material 17 may have a lid 18 removably attached to the container 16 to seal the container 16 and maintain the pliability and softness of the seal material 17. The lid 18 and/or the container 16 may have an indicia area 20 formed thereon. The indicia area 20 may be configured for advertising or promotion. In one aspect, a brand owner may utilize the indicia area 20 to advertise and promote a collateral product owned or supplied by the brand owner. In another aspect, one may direct another to place advertising and promotional material for a third party in the indicia area 20. The container 16 and/or lid 18 may be provided as part of a kit to enable one to place advertising and promotional material in the indicia area 20. In this way, a user may induce another to utilize the container 16 and/or lid 18 to provide advertising and promotional material for others.

Figure 2:
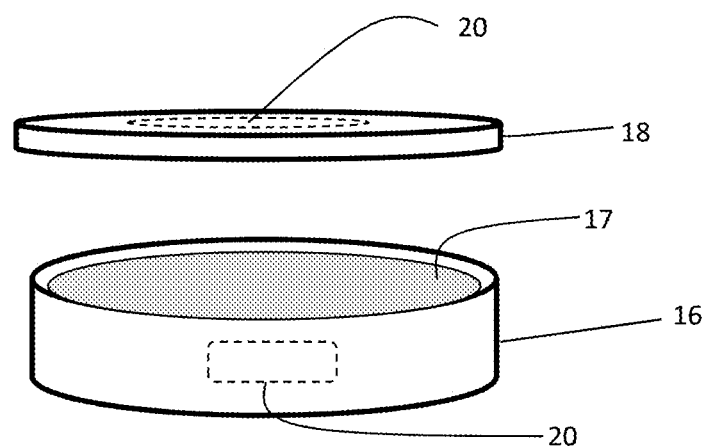
FIG. 2 is an alternate perspective view of the container of FIG. 1.
Figure 3:
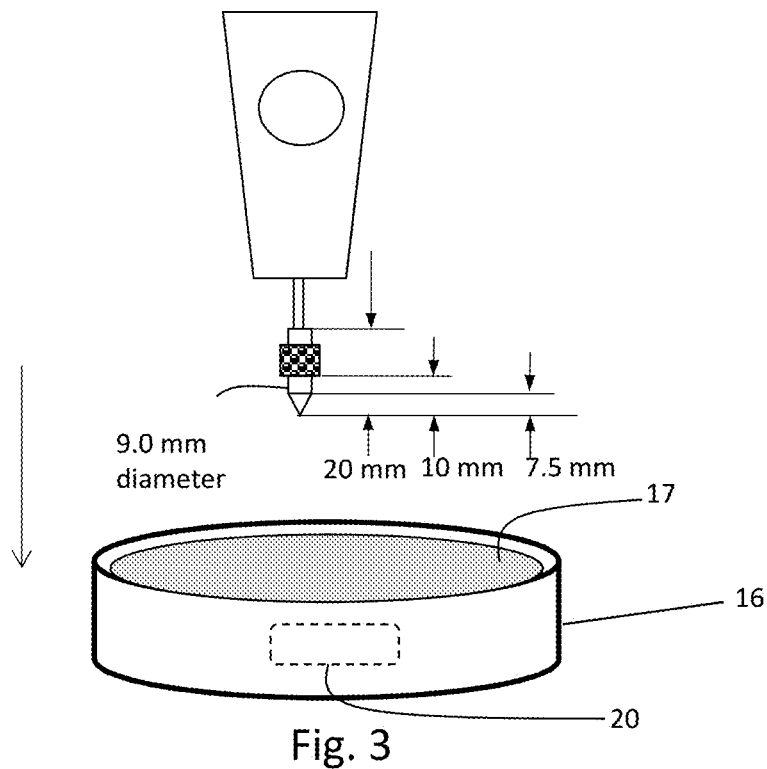
FIG. 3 is a schematic diagram of a penetration resistance test.

In one aspect, a method may include providing a container 16 and/or lid 18 as shown in FIGS. 1-2, and directing a user to provide advertising and promotional material of another brand owner in the indicia area 20. In another aspect, a brand owner may be directed to provide advertising and marketing material in the indicia area 20 of the container 16 and/or lid 18 as shown in FIGS. 1-2. In another aspect, the method may include providing a container 16 and/or lid 18 as shown in FIGS. 1-2 and promoting a product by placing advertising and promotion material for the product in the indicia area 20. The product may be used with the caulking or may be unrelated to caulking or its uses, except for the advertising and promotional material provided in the indicia area of the container 16 and/or lid 18. In another aspect, the container 16 and/or lid 18 as shown in FIGS. 1-2 may be used in connection with a kit with another part of the kit comprising a product that is advertised or promoted in the indicia area of the container and/or lid.

As various modifications could be made in the constructions and methods herein described and illustrated without departing from the scope of the invention, it is intended that all matter contained in the foregoing description are shown in the accompanying drawings shall be interpreted as illustrative and not as limiting. The breadth and scope of the present invention should not be limited by any of the above-described exemplary embodiments.

What is claimed is:

1. A sealant for releasably sealing a distal end of a tip of a tube containing a curable substance dispensable from the tip of the tube, the sealant comprising a homogenous composition including at least one wax and having between about 20 N and about 60 N of penetration resistance force in a penetration resistance test, wherein the penetration resistance test comprises: (i) placing the sealant in a container at room temperature such that the sealant has a top surface defining a plane; (ii) attaching a conical probe to a force gage wherein the conical probe has a tip length of 7.5 mm, a diameter of 9 mm, and an overall length of 20 mm; (iii) moving the conical probe perpendicularly relative to the plane of top surface of the sealant; and (iv) inserting the conical probe into the sealant to an insertion depth of between 8 mm and 12 mm to generate the penetration resistance force.

2. The sealant of claim 1 wherein the sealant is configured to completely abut interior surfaces around the distal end of the tip of the tube, be level with the distal end of the tip of the tube, and be releasable from tube without degradation of the curable substance in the tube after storing the tube upright at room temperature for at least 7 days.

3. The sealant of claim 2 wherein the distal end of the tip of the tube has a diameter of ⅛ inches.

4. The sealant of claim 2 wherein the distal end of the tip of the tube has a diameter of ¼ inches.

5. The sealant of claim 2 wherein the distal end of the tip of the tube has a diameter of 5/16 inches.

6. The sealant of claim 1 wherein the at least one wax comprises two waxes, and the sealant comprises about 60% by weight slack wax and about 40% by weight creme wax.

7. The sealant of claim 1 wherein the penetration resistance force of the sealant is between about 25 N and about 40 N in the penetration resistance test.

8. A container comprising a sealant for releasably sealing a distal end of a tip of a tube containing a curable substance dispensable from the tip of the tube, the sealant comprising a homogenous composition including at least one wax and having between about 20 N and about 60 N of penetration resistance force in a penetration resistance test, wherein the penetration resistance test comprises: (i) placing the sealant in a container at room temperature such that the sealant has a top surface defining a plane; (ii) attaching a conical probe to a force gage wherein the conical probe has a tip length of 7.5 mm, a diameter of 9 mm, and an overall length of 20 mm; (iii) moving the conical probe perpendicularly relative to the plane of top surface of the sealant; and (iv) inserting the conical probe into the sealant to an insertion depth of between 8 mm and 12 mm to generate the penetration resistance force, and wherein the circumference of the container is at least two times larger than a largest diameter of the tip of the tube.

9. The container of claim 8 wherein the sealant is configured to completely abut interior surfaces around the distal end of the tip of the tube, be level with the distal end of the tip of the tube, and be releasable from tube without degradation of the curable substance in the tube after storing the tube upright at room temperature for at least 7 days.

10. The container of claim 9 wherein the distal end of the tip of the tube has a diameter of ⅛ inches.

11. The container of claim 9 wherein the distal end of the tip of the tube has a diameter of ¼ inches.

12. The container of claim 9 wherein the distal end of the tip of the tube has a diameter of 5/16 inches.

13. The container of claim 8 further comprising an indicia area on an exterior of the container.

14. The container of claim 13 wherein the indicia area includes indicia comprising instructions for use of the sealant of the container in sealing the curable substance within the tube.

15. The container of claim 13 wherein the indicia area includes promotional material for products relating to the contents of the tube.

16. The container of claim 8 wherein the at least one wax comprises two waxes, and the sealant comprises about 60% by weight slack wax and about 40% by weight creme wax.

17. The container of claim 8 wherein the penetration resistance force of the sealant is between about 25 N and about 40 N in the penetration resistance test.

18. The container of claim 8 wherein the length of sealant deposited in the tip of the tube is between ¾ inch and 1 inch.

19. The container of claim 8 wherein a fluid capacity of the container is 2 ounces.

20. The container of claim 8 wherein a height of the container is about 1.333 inches.

* * * * *